(12) United States Patent
Kammler

(10) Patent No.: US 8,533,592 B2
(45) Date of Patent: *Sep. 10, 2013

(54) ADAPTIVE DISPLAY SYSTEM AND METHOD FOR A GAMING MACHINE

(76) Inventor: Keith Donald Kammler, Las Vegas, NV (US)

( * ) Notice: Subject to any disclaimer, the term of this patent is extended or adjusted under 35 U.S.C. 154(b) by 86 days.

This patent is subject to a terminal disclaimer.

(21) Appl. No.: 13/275,052

(22) Filed: Oct. 17, 2011

(65) Prior Publication Data

US 2012/0034977 A1    Feb. 9, 2012

Related U.S. Application Data

(63) Continuation of application No. 12/123,945, filed on May 20, 2008, now Pat. No. 8,042,043, which is a continuation of application No. 10/938,351, filed on Sep. 10, 2004, now Pat. No. 7,392,470.

(60) Provisional application No. 60/502,428, filed on Sep. 12, 2003.

(51) Int. Cl.
*G06F 17/00* (2006.01)

(52) U.S. Cl.
USPC .......................................................... 715/273

(58) Field of Classification Search
USPC ........................................ 715/273; 463/1, 30
See application file for complete search history.

(56) References Cited

U.S. PATENT DOCUMENTS

| | | | |
|---|---|---|---|
| 6,769,009 B1 * | 7/2004 | Reisman | 709/201 |
| 6,990,513 B2 * | 1/2006 | Belfiore et al. | 709/203 |
| 2002/0069282 A1 * | 6/2002 | Reisman | 709/227 |

* cited by examiner

*Primary Examiner* — Laurie Ries

(74) *Attorney, Agent, or Firm* — McAndrews, Held & Malloy, Ltd.

(57) ABSTRACT

The present invention provides a system and method for a configurable gaming system. Certain embodiments of the system include a local storage for storing a markup language file and token resolution information and a markup language viewer for processing the markup language file. The markup language viewer processes contents of the markup language file and resolves tokens in the markup language file using the token resolution information from the local storage to generate a resolved markup language file for display at a gaming system. The markup language file may include display content, markup language tags, and tokens. The markup language file may include read-only information and variable information to be resolved by the markup viewer for display. The markup language file may be a binary markup language file including tokens or other indicia for resolution.

25 Claims, 9 Drawing Sheets

```
<?xml version="1.0" encoding="UTF-8"?>
<Deck FontName="Verdana" FontSize="10" FontColor="000000"
   BackColor="FFFFFF" ButtonColor="808080">
     <Form ID="1" NextFormInterval="20" NextFormLink="#3">
       <Graphic ID="999" X="0" Y="0" Link="" ImageFile="background.gif" />
       <Label ID="1" X="230" Y="50" FontName="Verdana" FontSize="28"
          FontColor="000000" Text="Welcome"/>
       <Label ID="2" X="220" Y="110" FontName="Verdana" FontSize="14"
          FontColor="000000" Text="to the casino"/>
     </Form>

<Form ID="2" NextFormInterval="10" NextFormLink="#3">
       <Graphic ID="999" X="0" Y="0" Link="" ImageFile="background.gif" />
       <Label ID="1" X="230" Y="50" FontName="Verdana" FontSize="28"
          FontColor="000000" Text="Welcome [NN]"/>
       <Label ID="2" X="220" Y="110" FontName="Verdana" FontSize="14"
          FontColor="000000" Text="You have [PTS] points"/>
     </Form>

<Form ID="3">
       <Graphic ID="999" X="0" Y="0" Link="" ImageFile="background.gif" />
       <Label ID="1" X="230" Y="50" FontName="Verdana" FontSize="28"
          FontColor="000000" Text="Good Luck!"/>
       <Label ID="2" X="220" Y="110" FontName="Verdana" FontSize="14"
          FontColor="000000" Text="Countdown: [COUNTDOWN]"/>
       <Label ID="3" X="220" Y="170" FontName="Verdana" FontSize="14"
          FontColor="000000" Text="Session Pts: [SP]"/>
     </Form>

<Form ID="4" NextFormInterval="10" NextFormLink="#3">
       <Graphic ID="999" X="0" Y="0" Link="" ImageFile="background.gif" />
       <Label ID="1" X="230" Y="50" FontName="Verdana" FontSize="28"
          FontColor="000000" Text="Congratulations"/>
       <Label ID="2" X="220" Y="110" FontName="Verdana" FontSize="14"
          FontColor="000000" Text="You've earned [SP] points"/>
     </Form>
</Deck>
```

```xml
<?xml version="1.0" encoding="UTF-8"?>
<Deck FontName="Verdana" FontSize="10" FontColor="000000"
    BackColor="FFFFFF" ButtonColor="808080">
    <Form ID="1" NextFormInterval="20" NextFormLink="#3">
        <Graphic ID="999" X="0" Y="0" Link="" ImageFile="background.gif" />
        <Label ID="1" X="230" Y="50" FontName="Verdana" FontSize="28"
            FontColor="000000" Text="Welcome"/>
        <Label ID="2" X="220" Y="110" FontName="Verdana" FontSize="14"
            FontColor="000000" Text="to the casino"/>
    </Form>

<Form ID="2" NextFormInterval="10" NextFormLink="#3">
        <Graphic ID="999" X="0" Y="0" Link="" ImageFile="background.gif" />
        <Label ID="1" X="230" Y="50" FontName="Verdana" FontSize="28"
            FontColor="000000" Text="Welcome [NN]"/>
        <Label ID="2" X="220" Y="110" FontName="Verdana" FontSize="14"
            FontColor="000000" Text="You have [PTS] points"/>
    </Form>

<Form ID="3">
        <Graphic ID="999" X="0" Y="0" Link="" ImageFile="background.gif" />
        <Label ID="1" X="230" Y="50" FontName="Verdana" FontSize="28"
            FontColor="000000" Text="Good Luck!"/>
        <Label ID="2" X="220" Y="110" FontName="Verdana" FontSize="14"
            FontColor="000000" Text="Countdown: [COUNTDOWN]"/>
        <Label ID="3" X="220" Y="170" FontName="Verdana" FontSize="14"
            FontColor="000000" Text="Session Pts: [SP]"/>
    </Form>

<Form ID="4" NextFormInterval="10" NextFormLink="#3">
        <Graphic ID="999" X="0" Y="0" Link="" ImageFile="background.gif" />
        <Label ID="1" X="230" Y="50" FontName="Verdana" FontSize="28"
            FontColor="000000" Text="Congratulations"/>
        <Label ID="2" X="220" Y="110" FontName="Verdana" FontSize="14"
            FontColor="000000" Text="You've earned [SP] points"/>
    </Form>

</Deck>
```

FIG. 4

ADAPTIVE DISPLAY SYSTEM AND METHOD FOR A GAMING MACHINE

RELATED APPLICATIONS

The present application relates to, and claims priority as a continuation from, U.S. patent application Ser. No. 12/123,945, filed on May 20, 2008, which is a continuation of U.S. patent application Ser. No. 10/938,351, now U.S. Pat. No. 7,392,470, filed on Sep. 10, 2004, entitled "Adaptive Display System and Method for a Gaming Machine," which claims priority from U.S. Provisional Application No. 60/502,428, filed on Sep. 12, 2003, and is entitled "Communications Interface for a Gaming Machine." Each of these applications is incorporated by reference in its entirety.

BACKGROUND OF THE INVENTION

The present invention generally relates to a gaming system. In particular, the present invention relates to an adaptive display for a gaming system.

Gaming machines, such as slot machines, fruit machines, or poker machines, have in recent years become one of the more popular, exciting, and sophisticated wagering activities available at casinos and other gambling locations. At the same time, gaming machines have also become a source of greater revenue for gaming establishments. Thus, competition between manufacturers of gaming machines has intensified as competitors vie for business from gaming establishments.

A gaming machine providing entertaining and enticing features for players would be highly desirable to attract both new and returning players to a gaming establishment. Additionally, a gaming machine that allows customization and dynamic modification by an operator would be highly desirable to provide new features to customers.

Current gaming machines are difficult to reconfigure and offer the same game to multiple users at multiple gaming establishments. Changing a gaming machine to a different game or format involves time-consuming and difficult procedures by an operator.

Additionally, configuration of a gaming machine by an operator raises concerns regarding security of data and integrity of a game on the gaming machine. That is, gaming establishments and legal authorities place high priority on the integrity of a game, such as a slot or poker game. Thus, there is a need for a configurable system that does not disturb sensitive game or prize data.

A markup language, particularly Hypertext Markup Language or HTML, is used to provide display content in the form of web pages for web browsers on personal computers. Browsers allow web pages to be retrieved from a remote web server and viewed on a local computer. In current systems, apart from temporary storage for display, the information from the web page does not remain at the browser. A request is sent from the browser to the web server. A page is returned by the server. Information may be provided through fields in the page and transmitted back to the web server. The web server renders the web page and sends the page to the web browser for display. If the displayed page is to be changed, an application must be run to change the page, and the browser must retrieve an entire new page from the server. A more flexible and efficient markup language document system would be highly desirable.

Thus, there is a need for an adaptive display system and method for a gaming machine that allows one or more gaming machines dynamically alter operation and display.

BRIEF SUMMARY OF THE INVENTION

The present invention provides a system and method for a configurable gaming system. Certain embodiments of the system include a local storage for storing a markup language file and token resolution information and a markup language viewer for processing the markup language file. The markup language viewer processes contents of the markup language file and resolves tokens in the markup language file using the token resolution information from the local storage to generate a resolved markup language file for display at a gaming system.

The markup language file may include display content, markup language tags, and tokens. The markup language file may include read-only information and variable information to be resolved by the markup viewer for display. In an embodiment, the markup language file is updated from an external storage. The markup language file may be a binary markup language file including tokens or other indicia for resolution. In an embodiment, the markup language file associates items for display with identifiers, where the identifiers correspond to instructions for the markup language viewer. In an embodiment, the system further includes an external event controlling selection of a markup language file for processing by the markup language viewer.

Certain embodiments of a method for dynamic configuration of a gaming display include processing a markup language file to identify tokens to be resolved, resolving the tokens to generate a resolved markup language file, formatting the resolved markup language file for display, and displaying the resolved markup language file at a gaming system. The method may also include retrieving the markup language file from a local storage. Additionally, the method may include adjusting token values in the resolved markup language file based on a change in at least one of game, prize, location, player, and operator.

In an embodiment, the resolving step includes resolving tokens in the markup language file using data from the local storage. The resolving step may include resolving tokens in the markup language file based on at least one of a player, an operator, a game, and a location. In an embodiment, the displaying step may include displaying the resolved markup language file at the gaming system using a viewer. An external process may affect selection of the markup language file for processing and display.

Certain embodiments of a dynamically configurable gaming system include a gaming machine retrieving a markup language document, and a local storage device providing a copy of the markup language document to the gaming machine. The gaming machine resolves tokens in the markup language document and formats the markup language document for display. The local storage device provides the gaming machine with information to resolve tokens in the markup language document for display.

The system may also include a server providing information relating to the markup language to the gaming machine. The gaming machine may further include a markup language viewer for resolving the tokens in the markup language document and formatting the markup language document for display. The system may also include an external control controlling selection of a markup language file for processing by the gaming machine.

In an embodiment, the markup language document is adjusted based on a change in at least one of game, prize, location, player, and operator. The markup language document may include display content and indicia, for example. The markup language document may include a binary markup language document.

Certain embodiments of a system for connecting to a plurality of electronic gaming devices for acquiring, storing and displaying data in a regulated environment include an electronic display associated with each device and a host computer in communication with the processors to receive operation data from the devices. The device includes a processor to control the display. Each processor includes a first program of instructions in a markup language stored in a data structure. The content of the first program includes regulatory approved read only code module configured to (1) control the display to display a predetermined display template defining at least one volatile data field and (2) issue data commands for data tokens. The host is configured to (1) based upon the data received from the devices derive the data tokens and (2) in response to receipt of a command from the processor, communicate the derived token to the processor to control the display to display the token data in the data field.

In an embodiment, the markup language includes a binary markup language. The markup language may associate the instructions with areas of the display template. The display may include a user interface allowing a user to select one or more areas of the display template to execute instructions in the markup language code. In an embodiment, the host computer derives the data tokens using information from a data storage device.

BRIEF DESCRIPTION OF SEVERAL VIEWS OF THE DRAWINGS

FIG. 4 shows a sample ML file used in accordance with an embodiment of the present invention.

Figure 1:
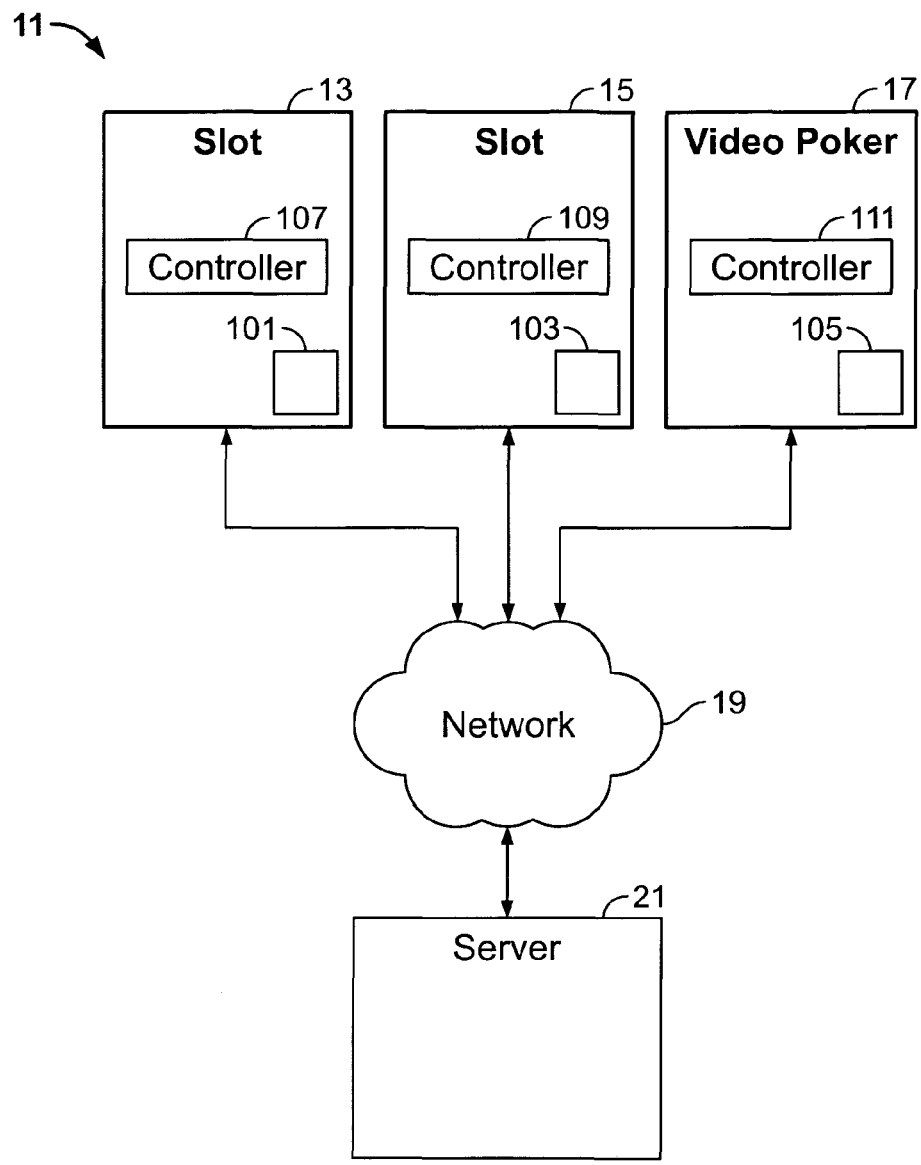
FIG. 1 illustrates a casino network system with an improved communications interface used in accordance with an embodiment of the present invention.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION OF THE INVENTION

Referring to FIG. 1, a casino network system 11 includes a plurality of gaming machines 13, 15, and 17 interconnected across a network 19 to a server 21.

Gaming machines 13, 15, 17 may utilize applications or web services of server 21 to provide visual displays. Gaming machines 13, 15, 17 may communicate with server 21 via network 19 using standard protocols.

Each gaming machine 13, 15, 17 includes a smart communications interface (SCI) 101, 103, 105, respectively, which communicates with a respective gaming controller 107, 109, 111 using a particular protocol, for example, a Slot Accounting System (SAS) protocol. SCIs 101, 103, 105 communicate directly onto network 19.

Server 21 may be designed to run on a network platform and to service requests from gaming machines 13, 15, 17. Server 21 may be accessed from network 19, through standard networking protocols, such as transmission control protocol/internet protocol (TCP/IP), user datagram protocol (UDP), telnet, file transfer protocol (FTP), hypertext transport protocol (HTTP), internet control message protocol (ICMP), internet group management protocol (IGMP), etc. Documents, such as hypertext markup language (HTML), extensible markup language (XML), rich text format (RTF), etc., may be transmitted to and/or from server 21.

Server 21 has a multi-tiered architecture that includes a number of software layers including one or more applications, an application program interface (API) and an operating system. The applications provide a number of different services, including accounting services, player tracking services, progressive game services, browsing services, cashless play services, etc. The applications may be written in various languages including, for example, C#, Java, or SQL. The operating system for example, is a Windows® brand operating system which provides conventional functions.

Server 21 may push out, i.e., publish, information to various subscribers including gaming machines 13, 15, 17. For example, gaming machine 13 may subscribe to a "bonus time" alert. Server 21 notifies gaming machines that have subscribed that a bonus period has started and that jackpots are to be paid out at twice the pay table, for example. This bonusing service for particular gaming machines may be subscribed to, for example, using casino workstation 31 (not shown). Workstation 31 may communicate a request to server 21 to publish to specifically identified gaming machines that a bonus period is to begin. The request may also provide additional information as to the amount of the bonus, the type of bonus, a bonus multiplier, etc. The request may also ask server 21 to publish the end of the bonus period as well. The server 21 may provide such a bonus service in real time with the bonus event, or merely provide a scheduled command for future bonus events.

In another example, applications server 21 may publish to certain gaming machines that a tournament has ended. Using the method taught in U.S. Pat. No. 6,039,648, assigned to Casino Data Systems and incorporated herein by reference, server 21 may communicate the end of a tournament play, so that appropriate pay tables and displays at the gaming machines may be activated.

Server 21 may include a plurality of functions that may be called by other systems or devices connected to network 19. Such functions may include conventional method or function calls as well as remote calls, e.g., proxy and simple object access protocol (SOAP)/XML invocations. For example, server 21 may be called by gaming machines 13, 15, 17.

Server 21 provides data to or retrieves data from a database 45. For example, data is stored as to gaming activity, player account information, advertisements, ticketing, etc. For example, meter data is received by server 21. Server 21 stores, the meter data in a database. Also, data is retrieved including player information, accounting data, application programs, etc.

For purposes of simplicity, only three gaming machines 13, 15, 17 are shown in FIG. 1. In actuality, a casino may contain hundreds, or even thousands, of gaming machines. In addition to gaming machines, a casino may include various non-gaming machine locations, such as craps and blackjack. Such locations include an SCI, similar to SCI 101, 103, or 105, which is connected to network 19. In an embodiment, gaming and non-gaming machine locations may be spread throughout several casinos located remotely from one another.

Server 21 provides services for each gaming machine. Server 21 may provide different services for different gaming machines. For example, gaming machines may be included in a progressive game and thus use a progressive service from server 21. Typically, all gaming machines use an accounting service from server 21 which accounts for coins and bills inserted into the gaming machine as well as an accounting of coins cashed out of the gaming machine to a player.

Other services, such as player tracking and cashless play services, may be provided by server 21. A typical player account may be stored in a database for tracking of the player. The player accounts are updated by server 21 as player information is sent to server 21 from gaming machines 13, 15, 17, workstation 31 or an external system 33. For example, a restaurant acting as an external system 33 may request server 21 to add loyalty points to the player's account in the database based on the amount of money spent by the player at the restaurant. As another example, a player at gaming machine 13 may request server 21 to convert 1000 points of the points balance in the player's account to credits on the credit meter of gaming machine 13. As another example, server 21 may provide game programs or other parameters to a particular gaming machine.

More specifically, gaming machine 13 sends a service request to server 21. SCI 101 packages the request in a proper protocol and places the request onto network 19. Various switches and/or routers may be included in network 19 in order to route the service request to server 21. The request may include (1) data, (2) a message request, and (3) the network address of server 21. The message request seeks a particular service to be performed by execution of an application by server 21. The application is run in connection with the data, if any, in the request. The application may then generate a message back onto network 19 addressed to machine 13. SCI 101 receives the message and responds accordingly, as for example, adjusting the credit meter, generating a display of information to the player, etc.

Alternatively, SCI 101, 103, or 105 may be connected to a hub for wireless communication of the service request to the network 19. The service request is received by the hub, repackaged and then broadcast to a receiving device that is connected to the network. The receiving device packages the service request and places the service request onto the network.

Figure 2:
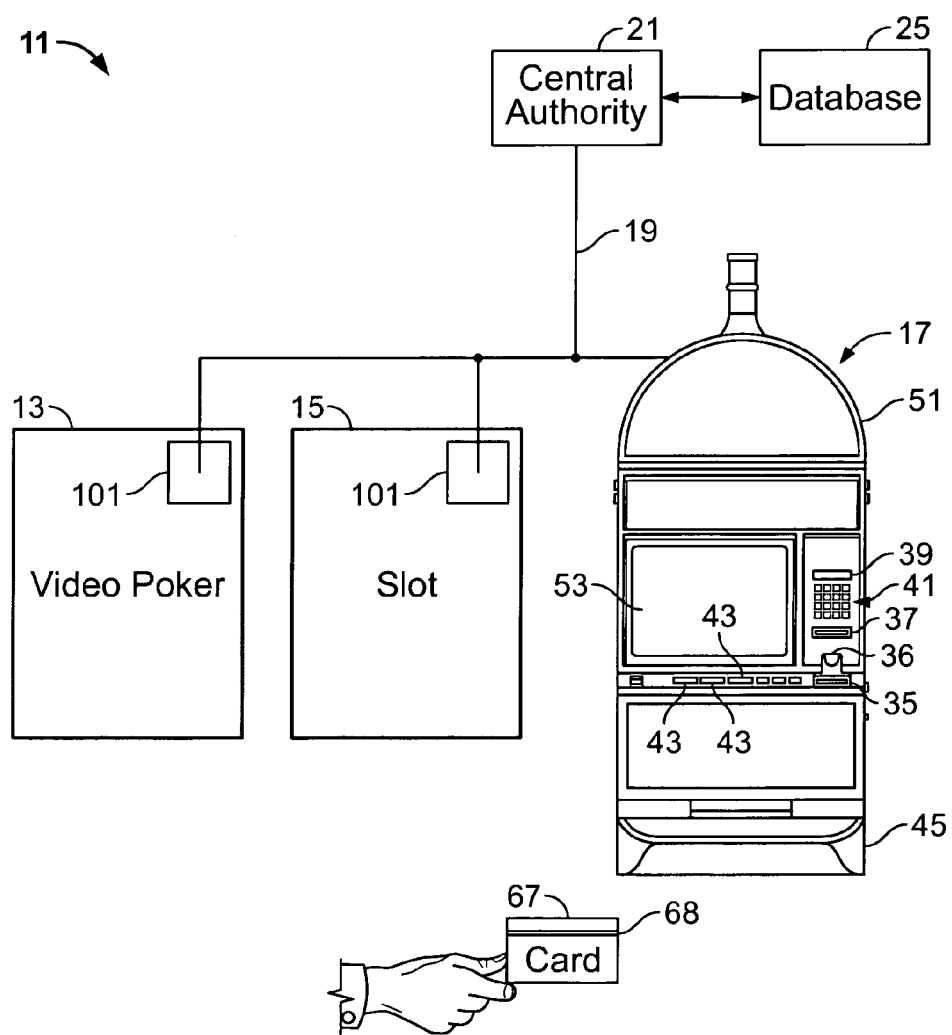
FIG. 2 illustrates an embodiment of a casino network system with an improved communications interface used in accordance with an embodiment of the present invention.

Referring to FIG. 2, another embodiment of a gaming system 11 includes a plurality of gaming machines 13, 15 and 17 interconnected over a network 19 to a central authority 21. Where a large number of gaming machines are connected to central authority 21, network 19 may include subnetworks using RS485 serial communications standard, for example, and data collection units (not shown). Network 19 also may be configured as an Ethernet network employing TCP/IP protocol, or may comprise a digital subscriber line (DSL) network, a fiber optic network, an RF network, etc.

Data is transmitted over network 19 between the gaming machines and central authority 21 which may be formed of one or more computers. Each gaming machine includes a smart communications interface (SCI) 101 for control of communications over network 19. Interface 101 is a microprocessor-based device. Central authority 21 stores game output data (received from the gaming machines) and may store game input data (to be sent to the gaming machines) in a central database 25.

More than the three gaming machines 13, 15 and 17 may be connected to network 19 of FIG. 2. For example, gaming machines 15 and 17 are slot electronic gaming machines and gaming machine 13 is a video poker electronic gaming machine. Other types of gaming equipment and gaming machines may be connected to network 19 of FIG. 2, including table games.

Gaming machine 17 is shown in more detail in FIG. 2 and includes a housing 51 that supports a number of components including a main display 53 which is positioned on the outer front face of the machine for direct presentation of a display to the player. An input area 35 receives a wager from the player in the form of currency bills or bar-coded vouchers. A card receiving slot 37 is positioned to receive a player card for use to identify the particular player at the gaming machine, as described hereinafter. A secondary display 39 also may be included, for the display of supplemental non-game information to the player, typically, in the form of instructions, points balances, or other information. As understood, all or part of supplemental display 39 may take the form of a display window located on primary display 53 or a secondary window on display 53. A keypad 41 is provided to allow the player to input data to the SCI of the gaming machine, particularly in response to instructions or questions on supplemental display 39. In addition, a plurality of decision making buttons 43 (and optionally a handle, not shown) are used by the player to play the game of machine 17. A payout tray 45 provides an area for redemption of awards based on play of the game, and a printer (not shown) may be used to print tickets or other redemption documents.

Display 53 displays the primary game features for play of a game. For example, the display may generate a conventional slot game in which a plurality of symbols are moved within their respective column, as if rotated, at the appropriate time in response to the user activation of the gaming machine.

Figure 3:
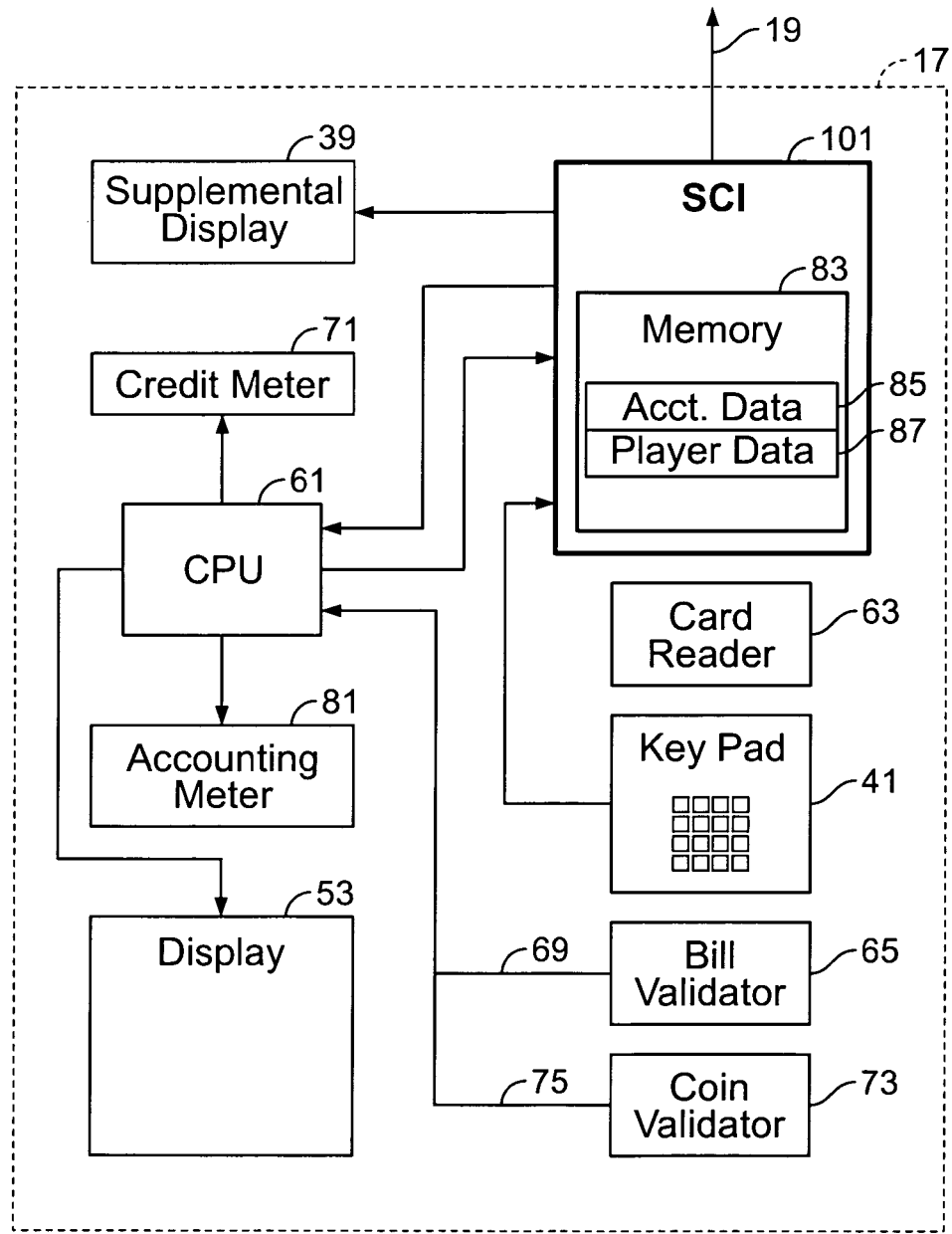
FIG. 3 depicts a gaming machine used in accordance with an embodiment of the present invention.

Referring now to FIG. 3, gaming machine 17 includes a game control CPU 61 which is responsible for carrying out the main functions of the gaming machine. CPU 61 executes each game as the player interacts with the gaming machine, including visually and/or audibly interacting with the player, as well as generating game outcomes. In addition, CPU 61 processes network information by receiving from, and sending data to, smart communications interface (SCI) 101. CPU 61 includes a microprocessor and associated memory (not shown particularly). Depending upon the type of gaming machine, CPU 61 may directly carry out some or all of the functions that SCI 101 may carry out.

Gaming machine 17 includes a number of peripheral devices including, for example, a card reader 63 and key pad 41. Card reader 63 and key pad 41 are used to identify the player at the gaming machine 17. The casino issues a player a player card 67 (FIG. 2) through an application process. Player card 67 typically includes a magnetic stripe 68 that is encoded with data to identify the player. In some cases, a personal identification number (PIN) is given to the player for security, and may allow access to certain features of the gaming machine. Card 67 is readable by a card reader 63 found in each of the gaming machines 13, 15, 17. Other types of cards may be utilized including optical cards, smart cards, etc.

In addition, a unique number is encoded onto a magnetic stripe 68 carried by the card. This unique number corresponds to a player account file which is maintained by central authority 21 in database 25. The account file may include information such as the player's name, address, amount of credit available, amount of promotional credits, amount of loyalty points, etc.

The player inserts his or her player card 67 into card receiving slot 37 (FIG. 2) for reading by card reader 63 (FIG. 3). SCI 101 detects the card insertion and receives the identification information contained on card 67. For example, the player's name, address and player tracking account number may be encoded on the magnetic stripe. The information contained on card 67 may be a reference number to retrieve player data from database 25.

SCI 101 provides display signals to display 39 in order to, for example, display the player's name, or other message. Select messages may be displayed, for example, requesting the player to optionally enter his or her personal identification number (PIN) using keypad 41. Where the PIN is optionally entered by the player, SCI 101 communicates with the central authority in order that the PIN, for example, may be used to validate the player's identity. In other cases, the PIN may be used to access some features of the gaming machine 17 or system 11. Either the central authority or the SCI performs validation.

SCI 101 gains access to the player's account at the central authority. The player's account typically includes the number of player points (loyalty points) previously accumulated by the player, as well as additional statistics. In order for the gaming activity at a particular machine to be credited to the player's player account, the player or player account is identified at the gaming machine. Identification is typically accomplished by the player inserting his or her player card.

A PIN alone without a player card may be used to provide player identity to the gaming machine; and a card alone without a PIN may be used to provide player identity to the gaming machine. Alternatively, any of several biometric devices may be used to identify the player, including devices to check fingerprints, scan facial appearance, provide eye scans, etc. Such biometric input data may be used alone or in combination with player cards or PINs.

During game play, CPU 61 tracks gaming activity and provides gaming activity information to SCI 101. Such information may include an amount of money a player has wagered on each game, a number of games played, a time each game was initiated and a particular identification of a gaming machine, etc. For example, a system may track money wagered, money won and the time period tracked. Tracked information may be obtained by the SCI polling the CPU. The game activity information is sent to the central authority by the SCI. The central authority utilizes the game activity information to perform accounting functions and additionally generates player points which are added to the points in the player's account. Awards are provided by the casino in accordance with points accumulated by the player.

Any pre-stored data in the player's account may be downloaded to SCI 101 which in turn provides corresponding signal data to CPU 61. Where gaming machine 17 allows for player selection of the particular game played, players may pre-store their game preference in central database 25 (FIG. 2). Preference data may be downloaded to gaming machine 17 after player identification at the gaming machine.

The communication between SCI 101, central authority 21 and CPU 61 may take on different forms and protocols, as for example, serial, parallel, ethernet, etc. In one embodiment, the SCI may be connected to the CPU 61 through a serial connection and communicates in accordance with a particular communication protocol or protocols depending upon the manufacturer of the particular gaming machine.

After a particular player has been identified as a valid player, other messages are presented on display 39. For example, the balance amount of points or credit remaining in the player's account may appear on the display. The player may use key pad 41 to download credits to the gaming machine, as described in U.S. Pat. No. 6,511,377 incorporated herein by reference.

Card reader 63 is housed in gaming machine 17, and positioned relative to card slot 37 to receive player card 67. Card 67 is inserted into reader 63 and information read from card stripe 68 is transferred to SCI 101 and stored in a memory 83 located in SCI 101.

A bill validator 65 is housed in gaming machine 17 and positioned relative to wager area 35 to receive currency bills inserted into validator 65 by a player. Bill validator 65, which may receive several bill denominations, detects the denomination of an inserted bill and generates a signal 69 to CPU 61. Bill validator 65 may also receive encoded vouchers or tickets and responsively generate a proper signal 69 relating to ticket insertion.

CPU 61, for example, responds to signal 69 by increasing the value on a game credit meter 71. Depending on the type of gaming machine, a value of credit meter 71 may be displayed on display 33. Credit meter 71 provides a visual indication to a player of a number of game credits available for play. In an embodiment, signal 69 may be sent to SCI 101, which in turn communicates with CPU 61 so as to change credit meter 71. Communication with the CPU through the SCI to change the credit meter may occur when a bill validator is retrofitted into a gaming machine that was originally manufactured without a bill validator. CPU 61 increases the credit meter after a ticket signal is received and value is determined.

A coin validator 73 is housed in gaming machine 11, and positioned relative to a coin slot 36 (FIG. 2) to receive coins which are inserted by a player into coin validator 73. Coin validator 73 generates a coin signal 75 to CPU 61. CPU 61, for example, responds by increasing the value of credit meter 71.

In accordance with a configuration of gaming machine 17, the gaming machine begins a game (for example, the reels spin) automatically after the credits appear on the credit meter or the game is started after the player presses a button 43 or pulls a handle (not shown).

Then, the game ends and a particular result appears. The gaming machine pays out certain amount(s) depending upon the result in a conventional manner. The pay out may include applying an amount directly to the credit meter 71, or paying the amount in coins or tokens directly from the slot machine to the player at tray 45, or where the amount is above a threshold level, a hand pay is made of the amount to the player. The player may cash-out credits by activating a cash-out button 43 or upload credits to the player's account in database 25. A ticket printer (not shown) may be used to dispense bar coded vouchers on cash-out, as well.

If a player desires to discontinue play or move to a different machine, the player removes the player card. Thereafter, the player card may be inserted into the same or a different gaming machine for continuing play.

The player's account may be formed of multiple accounts, for example, a CASH account, a POINTS account, a PROMO account, etc. Credit may be placed in the player's PROMO account by the casino as a complimentary incentive. This may happen when a player first arrives at the casino at hotel checkin or other event. Alternatively, credit may be applied to the player's CASH account in accordance with the player making a deposit of money, either coins or tokens directly into the slot machine or at a cashier. Such credits (or value) may be downloaded to the gaming machine and placed on credit meter 71.

The player's gaming activity is tracked by system 11 once the player account is established, the player has been issued a player tracking card bearing a unique identification number and the account is in a file in database 25, for example. The player's transactions at the gaming machine are logged by SCI 101 and reported to central authority 21.

In some situations, multiple player cards may be issued for a single account; each card identifies the same account. Each card may carry the same identification number. For example, a husband and wife may share a single account. The first card inserted allows the player to retrieve any or all of the credit available in the player's account. The second card inserted allows the second player to retrieve any remaining credit that remains in the account. Where both cards are simultaneously used on separate gaming machines, all player transaction activity is collected and forwarded to the player's account.

Numerous types of reports may be generated based upon the transaction activity logged in the player's account. For example, the amount of money played by the customer, the amount of credit used from the player's account, the amount of complimentary incentive credit utilized by the player, the amount of points converted to play credits at the game, the machine upon which the transaction occurred, the time of the play, or other event, etc.

Information Accounting by CPU 61

Referring again to FIG. 3, CPU 61 keeps a plurality of accounting meters 81 that log transaction and machine data. Meters may be formed of electronic memory managed by CPU 61 and/or hard meters. CPU 61 responds to various gaming machine events and updates meters 81 accordingly. Meters 81 may be non-reset, accumulative meters; however, some meters 81 may be reset meters and statistics are available since the last reset of the meters. Basic events in which CPU 61 adjusts meters 81 may include:

(1) money input by the player;
(2) wagers placed by the player;
(3) game wins from play of the game; and
(4) cash out of credits by the player.

Only the particular meter(s) 81 to which an event pertains are adjusted upon the occurrence of the event. Data identifying the occurrence of events may be recorded also, including the time of the event and the particular type of event.

For example, meters 81 may include various drop meters to track money flow. A drop meter may be provided for each of the different forms of monetary value accepted by the gaming machine. For example, a coin drop meter may represent the total value of coins that fall to a "drop bucket" within the gaming machine housing for later collection by the casino. Also, coins may instead be diverted to a hopper system for later payout to the player and such diverted coins may be metered separately. Also, a bill count drop meter may count all paper currency that has been inserted into the bill acceptor. As another example, promo count meters count promotional credits that are received by the gaming machine from bar coded coupons, downloaded credits, bonus point conversions, and the like. Outflow of cash to the player may also be tracked by meters, including printed vouchers that have been issued by the machine.

Meters 81 may also keep track of game activity and include a game play meter for tracking the total number of bets actually wagered and a game win meter for tracking the total number of wins. Purchased credits which are not wagered, but cashed out, may be tracked as well. Credit meter 71 is a visual meter which reflects the total amount of credit available to the player at any time, and may be driven from another meter 81.

SCI 101 Retrieves Data from CPU 61

CPU 61 communicates data to SCI 101 including events and readings of the accounting meters 81. For example, SCI 101 may poll CPU 61 for data, and then record such data in a memory 83. The data may be further processed by SCI 101, and then the processed data is stored in memory 83. Particular data stored in memory 83 includes accounting data 85 as well as player data 87 which is used to award player points.

SCI 101 performs game accounting functions by updating accounting data 85 and player data 87. SCI 101 transmits data 85, 87 to central authority 21. In addition, accounting data 85 and player data 87 may be initialized by central authority 21.

Type of Information Reported

Tracking of data at the gaming machines occurs for carded and non-carded players. A non-carded player is a player who does not insert a player card during play. SCI 101 may retrieve data from CPU 61 including data stored by CPU 61 in meters 81. SCI 101 may also keep data that SCI 101 has obtained from sources other than CPU 61, such as data obtained from card reader 63. SCI 101 may process the data and convert the data to a particular form prior to transmittal to central authority 21. For example, data regarding a number of coins played during a certain period of time may be calculated by SCI 101 based on coin-in meter data at a start of the period and coin-in meter data at an end of the period.

SCI 101 reports certain data to central authority 21 which is placed in database 25. However, SCI 101 reports particular data, i.e., player data 87, which is related to the game activity of the player. Central authority 21 uses player data 87 to calculate player points and store player points in a particular player account held in database 25. For example, central authority 21 may calculate a number of loyalty points based on coin-in data of the player, and thereafter store points data in a player account. Alternatively, SCI 101 may perform points calculation and transmit the points data for storage in the player account in database 25.

When Information is Reported

SCI 101 may report a variety of accounting data to central authority 21 at various times. SCI 101 reports player data 87 which SCI 101 has accumulated in connection with the occurrence of a gaming session. The data may be reported when a player removes his or her player card from card reader 63. Where a player has the ability to convert points stored in his or her account to credits at the gaming machine, the timing of points credited to the player account may become important. It may be desirable also to forward player data 87 at predetermined times, for example, every hour, where the player's gaming session occurs over a lengthy period of time.

Employee Cards

Employees of a gaming establishment, such as a casino, have employee cards that are insertable into a gaming machine. The employee card may include a magnetic stripe that is read upon insertion to alert SCI 101 that an employee is present at the gaming machine. Thereafter, particular functions of the gaming machine (or SCI 101) are made available to the employee.

When an employee card is inserted into reader 63, SCI 101 recognizes the card as an employee card. However, if an employee card is inserted, then normal employee menus are displayed on display 39. If a card may not be read then a message such as "BAD CARD READ" is displayed on display 39.

Identification of a player may be performed by a magnetic card reader, an optical card reader, a card swipe reader, a card insertion reader, a smart card reader, or other device which alerts SCI 101 by providing SCI 101 with player identification information of the player who is about to activate play on the gaming machine. Devices other than card readers may be used to provide identification information, such as a biometric sensor, a fingerprint sensor, a palm sensor, a hand sensor, an eye sensor, an iris sensor, a visual recognition system, an audio or voice recognition system. The device provides player identity information to SCI 101 at the time that the player is about to commence play. Player identity information may be transferred by radio waves or infra-red radiation, for example, from a portable or handheld device. Card removal may be determined in a number of ways, including sensors such as audio, visual, thermal, motion, infra-red, magnetic, light detectors, etc.

Smart Communications Interface

In an embodiment, SCI 101 (e.g., Sentinel II® or Sentinel MS) includes a user interface, such as a TFT (Thin Film Transistor) Active Matrix LCD interface (with optional touch screen), to provide static pictures and dynamic video clips with vivid color. The LCD display with touch screen may be used to enter information, such as player identification information or game play options. SCI 101 may also include an additional LCD character/VFD (Vacuum Fluorescent Display) graphic display interface. In addition, a Video Input Port (VIP) may be incorporated in SCI 101 to provide real-time videos or provide streaming videos. The SCI 101 may also include an audio system, such as an AC'97 Audio system or personal computer sound system. In addition, Voice over Internet Protocol (VoIP) technology may be used by SCI 101 to manage the delivery of voice information using Internet Protocol.

In an embodiment, SCI 101 includes a compact flash connector. The connector receives a conventional CompactFlash card. Use of compact flash or other volatile memory permits great convenience, reliability, availability and low cost. Markup language documents and other data may be stored in the CompactFlash or other memory card located in the connector.

SCI 101 provides a plurality of interfaces for communication from and/or to peripheral devices or gaming machine components. For example, SCI 101 may include a keyboard and/or mouse interface, a keypad interface, a progressive interface, a fiber-optical interface, a lockout interface, a magnetic/optical card reader interface, a Slot Data System (SDS)/IGT pulse interface, a slot accounting software (SAS)/GDAP interface, peripheral component interconnect (PCI) bus connection serial port, parallel port, infrared port, universal serial bus (USB) connection, an opto-isolated input, an opto-isolated output, and/or other interface.

Formatting a Gaming Machine Display Using a Markup Language (Rendering)

In an embodiment, a gaming machine, gaming workstation, or other gaming system uses a markup language (ML) for display and interaction purposes in a gaming or ancillary gaming application. A markup language viewer is used to facilitate display, execution, and/or parsing of data from a ML document. In current systems of the art, dedicated software routines specify the fixed locations of content, such as images, and references, such as links, by hard coding them in code or in tables of constants within the code. Conversely, a markup language document, as shown in FIG. 4, is an external, changeable document that is analyzed and parsed or rendered dynamically. Changes may be implemented without changing program code. When operation of a gaming machine transitions within an area of operation or from one area of operation to another, a markup language file may be loaded, parsed, and the information therein used to specify the content of a display. FIG. 4 shows a sample ML file used in accordance with an embodiment of the present invention.

In addition, replaceable "tokens" or other indicia may be used in a markup language in a gaming or ancillary gaming application. FIG. 4 illustrates a sample ML file including tokens to be resolved according to an embodiment of the present invention. Tokens in FIG. 4 are indicated by square bracket (e.g., "['s") to allow the ML viewer to resolve the tokens using a database or local storage.

In one embodiment, servers may utilize a server-side content generation program to provide unique and interactive content in response to client side queries. In another embodiment, rather than relying on a server to provide content specific to interaction, "client" side content is used. A client "page" contains certain "text" that is detected and replaced by other text or value when the page is rendered. In an embodiment, replacement text is of a dynamic nature and is retrieved from a local storage by a token look up method.

When a markup language document is rendered to a display, certain text markers, indicia, or "tokens" in the ML document are identified, isolated, extracted, and replaced in the rendered product. Once isolated and extracted, a token is "resolved" by a token look-up method that references actual data in a database or local storage based on the token in the ML document. Resolution of a token allows an unchanging ML document to be rendered with particular instance information.

Figure 5:
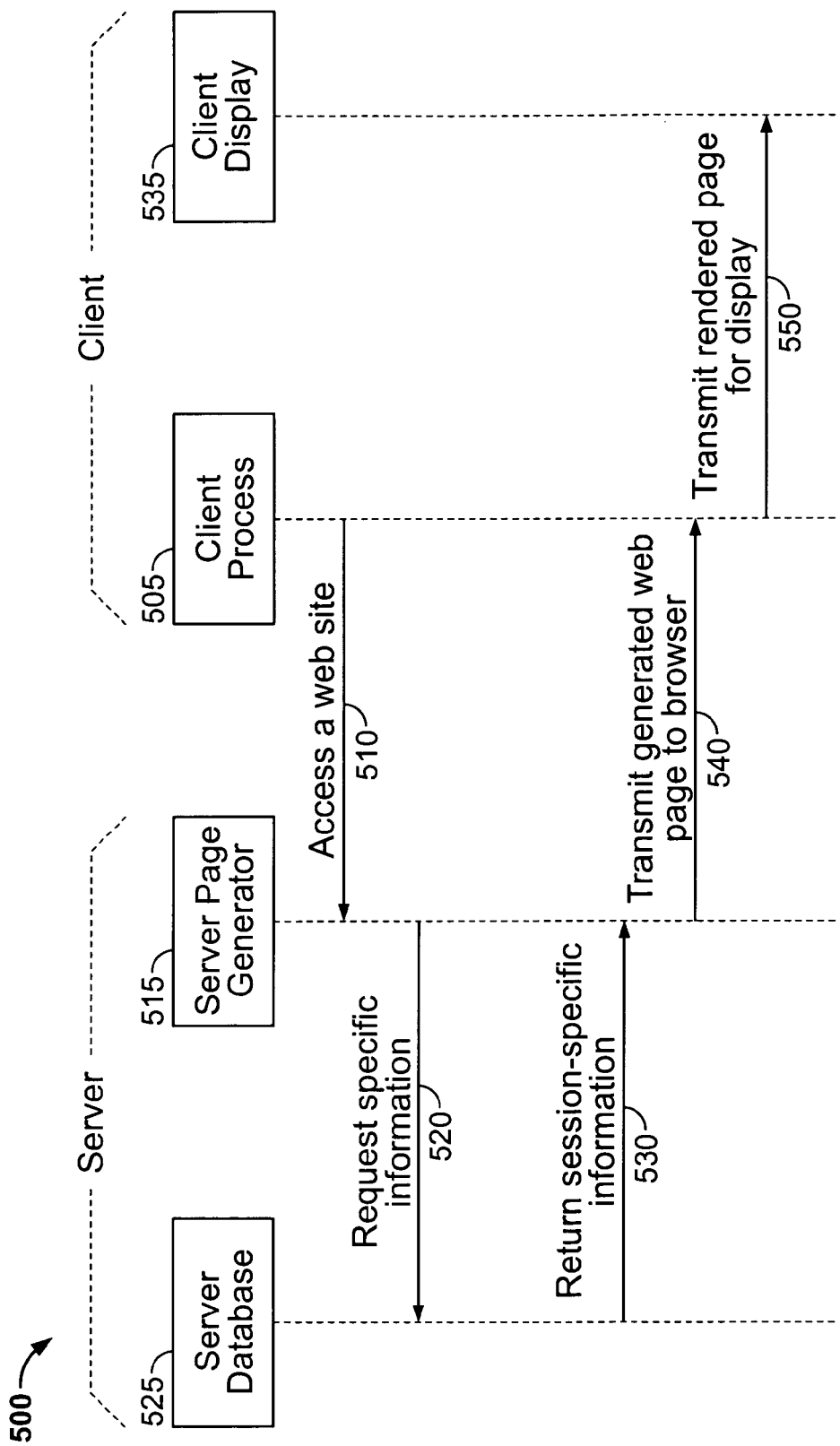
FIG. 5 shows a flow diagram depicting a traditional method of hardcoded HTML display.

A flow diagram 500 shown in FIG. 5 depicts a traditional method of hard-coded HTML display. First, at step 510, a client process 505, such as a web browser or viewer, accesses a web site generated by a server page generator 515 at a web server. Information entered at the client receives information from the server and sends information back to the server but does not store information at the browser. Then, at step 520, specific information is requested from a server database 525 by the server page generator 515 at the web server. Next, at step 530, the database 525 returns information specific to the client or session. The page generator 515 generates a web page from the specific information.

Then, at step 540, a web page or other fixed file is transmitted from the web server to the client web browser 505. The web browser or other client process 505 renders the web page for display. At step 550, the web page from the server is displayed at a client display 535. The web page is completely rendered when it is sent.

Figure 6:
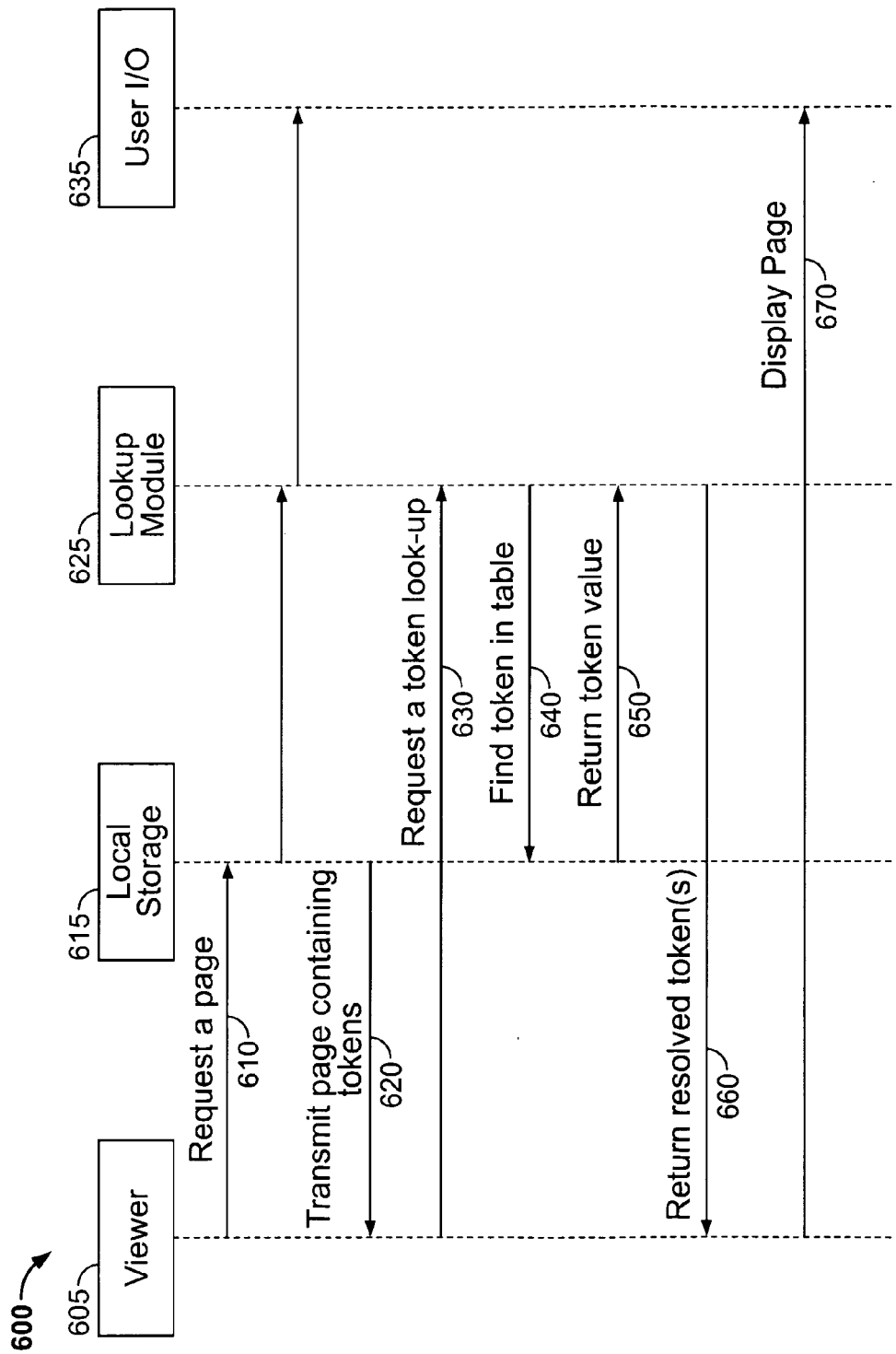
FIG. 6 shows a flow diagram depicting a method for token resolution used in accordance with an embodiment of the present invention.

FIG. 6 shows a flow diagram 600 depicting a method for token resolution used in accordance with an embodiment of the present invention. First, at step 610, the ML viewer 605 requests a file, such as a ML page, from local storage 615. Unless otherwise specified, for example, a default page is requested. For example, a viewer process running on an electronic gaming machine may request an initial page for a video poker game at startup. Then, at step 620, the file is returned to the viewer 605. The ML file includes tokens or other indicia, such as indicators surrounded by tildes, brackets, or other indicia.

Next, at step 630, the viewer 605 requests a token lookup. That is, the viewer 605 parses the ML file and identifies one or more tokens or other indicia in the file. The viewer 605 identifies tokens, for example, to be resolved in the ML file. For example, the viewer process identifies a coin denomination token in the ML file. At step 640, the token is located in the local storage 615 using the lookup method 625. Then, at step 650, a value for the token is returned to the lookup method 625. That is, a value assigned to the token or other indicia is retrieved from a table or database, for example, for use in resolving the ML file. For example, a value of one dollar corresponding to the denomination value is returned from a local database to the viewer process. The lookup method 625 resolves tokens or other indicia in the ML file. Token resolution may be repeated for multiple tokens in a file.

At step 660, the resolved token(s) are returned to the viewer process 605. For example, the file with resolved or completed tokens is sent to the viewer 605 for display. The viewer 605 renders the ML file for display. Then, at step 670, the file is displayed. For example, the rendered file with resolved tokens is displayed at a gaming system, such as a gaming machine or workstation.

Figure 7:
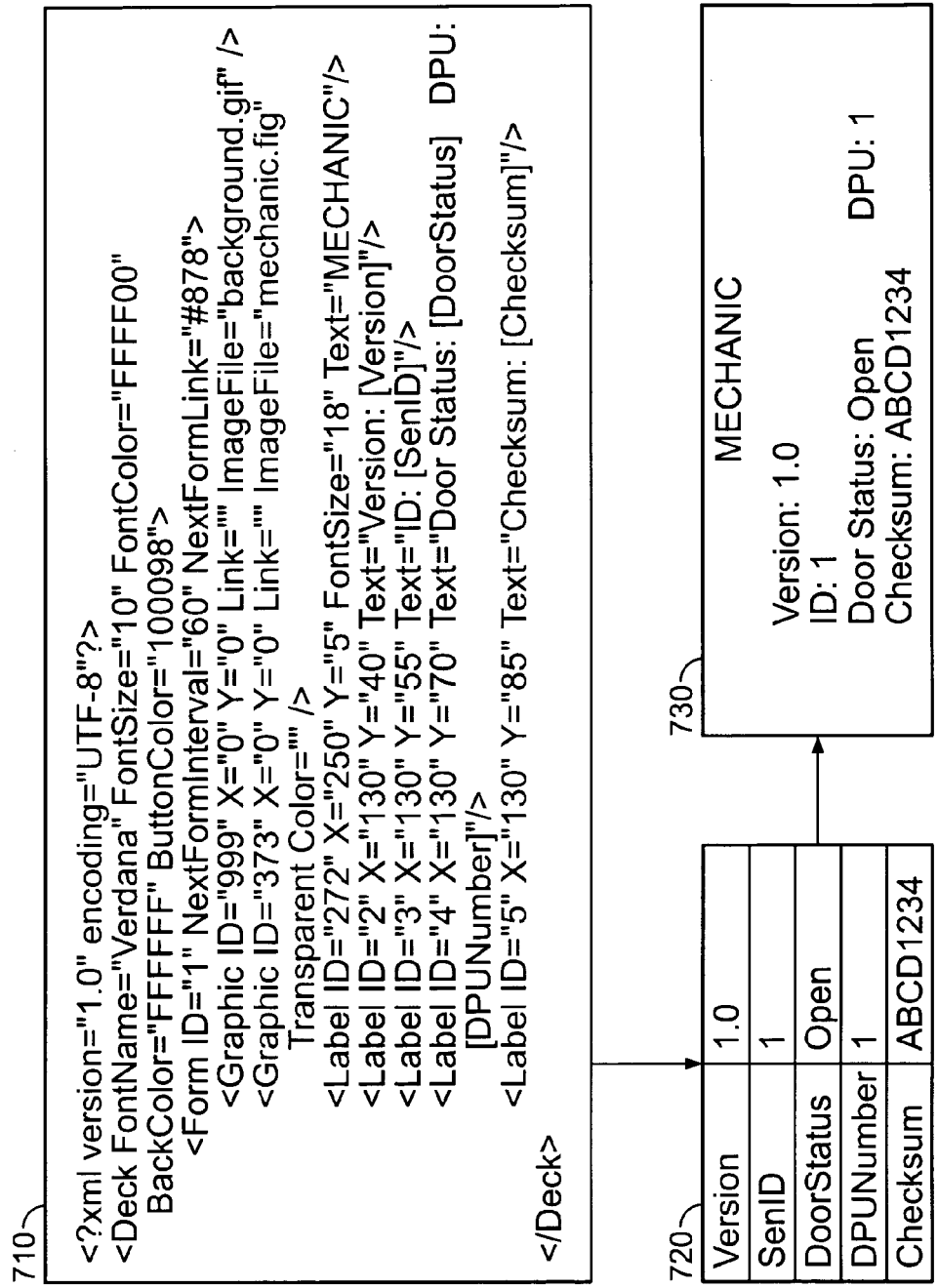
FIG. 7 illustrates an example of token resolution and display in a markup language document in accordance with an embodiment of the present invention.

FIG. 7 illustrates an example of token resolution and display in an ML file in accordance with an embodiment of the present invention. An ML document 710 includes information, such as tags, text, and/or tokens, to format a display in a gaming environment. An ML viewer parses document 710 and references table 720 to resolve tokens in document 710. For example, the ML viewer locates the [Version], [SenID], [DoorStatus], [DPUNumber], and [Checksum] tokens in document 710. The ML viewer resolves the tokens using a lookup method and local storage or database. Page 730 is then displayed including the resolved tokens.

Figure 8:
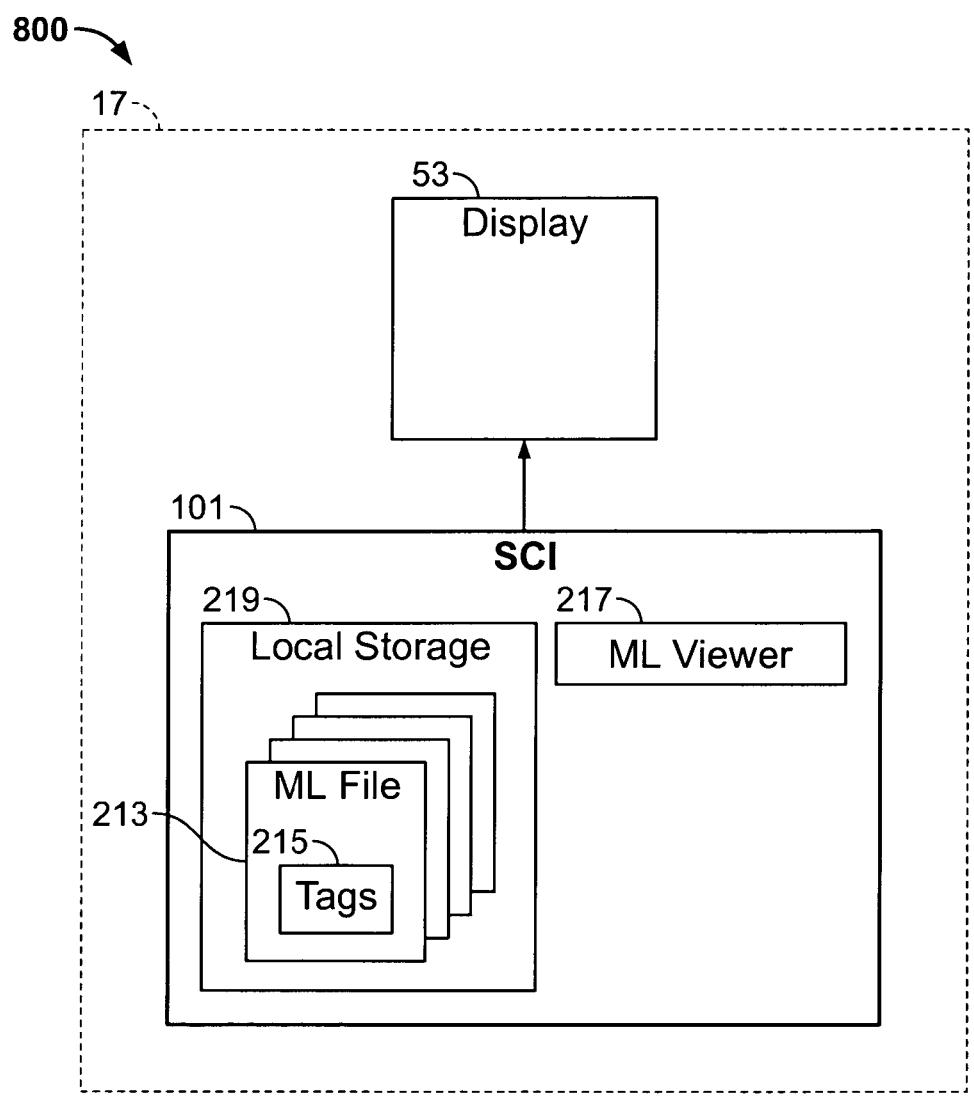
FIG. 8 illustrates a gaming system used in accordance with an embodiment of the present invention.

FIG. 8 illustrates a gaming system 800 used in accordance with an embodiment of the present invention. Gaming system 800 includes a gaming machine 17. The gaming machine 17 includes a local storage 219 including one or more ML files 213. In an embodiment, the system 800 may include a gaming workstation or other gaming system instead of or in addition to gaming machine 17. Each ML file 213 includes a markup language such as hypertext markup language (HTML), extensible markup language (XML) or other markup language. ML file 213 includes markup tags 215.

Markup tags 215 surround text, graphics and other instructions in ML file 213. Tags 215 instruct viewer 217 regarding formatting of contents of file 213 for display. For example, tags 215 may determine font, size, positioning, and other effects of display information, such as text and/or graphics. Tags 215 may include tokens to be resolved for display. Viewer 217 uses the markup tags 215 in the requested file 213 to format the text to be displayed. Viewer 217 displays the appropriate text of ML file 213 at a display 53.

In a markup language document, for example, HTML code or HTML tags 215 define how elements in the document are displayed. XML code or tags 215 define what the elements contain. HTML uses predefined tags 215. XML allows tags to be defined by the developer of the web page. Thus, XML is an open standard for describing data. XML may enable an ML document to function like database records. XML uses a similar tag structure to HTML.

The system 800 may also include a workstation or other system used to make changes to a particular ML file 213. A keyboard or other data entry device, such as a touch screen or mouse device, is used to interact with an edit program. ML file 213 is then modified using edit program.

In an embodiment, the ML viewer 217 may access ML documents that are stored on a network or other external storage. In an embodiment, the ML viewer 217 does not alter a local copy of an ML file 213 in local storage but rather temporarily stores a copy of the ML document in RAM or other temporary storage for display. The ML document may also be stored in persistent storage. Alternatively, local persistent storage, such as a hard disk drive, CD, CD-ROM, DVD-ROM, flash disk, compact flash, etc., may be used to store a copy of an ML document.

One ML file 213 may link to another local file or the current ML document. The ML viewer 217 may follow a link in a first ML document to access a second ML document. In an embodiment, the ML viewer 217 first accesses a predetermined document (for example, "index.html" or "default.html"). The predetermined or default file is displayed to a user or player by viewer 217 via display 53. Alternatively, in an embodiment, the viewer 217 may request the name or reference of the first ML document from an external process. Alternatively, a default file may be associated with a particular user and/or game being played on gaming machine 17. The default file may include one or more links to additional files. One or more links may be accessed by the ML viewer 217 depending upon user, game, or other setting for gaming machine 17. Thus, by accessing an initial ML file 213, a viewer 217 may update a gaming machine display 53 by following links and resolving tokens 215.

In one embodiment, the ML viewer 217 automatically cycles through several pages within one ML document or within different ML documents. In another embodiment, a user may select one or more pages 213 to display via viewer 217 on display 53. The user may select one or more links to pages 213 using the keyboard 221, a touch screen, a mouse "click", or other selection method. The user selects a button, link, or other indication on display 53 and instructs viewer 217 to "follow" the link to go to another section within the ML document or to another document. Typically, viewer 217 first displays a default ML file in local storage. Traversing from one document to another document via links or addresses automatically or by touch or click is referred to as "navigating."

The ML files 213 may be written in XML, HTML, XSL (extensible stylesheet language), XSLT (XSL transformation technology), WML (wireless markup language), binary XML, or WBXML (wireless binary XML), for example. The ML files 213 may also be edited locally and/or remotely. In an embodiment, a user is authenticated before an ML document may be modified.

The ML viewer 217 parses an ML file 213 to determine content and formatting instructions. The ML viewer 217 identifies tokens in the tags 215 or other areas of the ML file 213. Tokens indicate variables or values to be provided or "filled in" by other sources. Tokens may be denoted in an ML document using standard ML delimiters and/or custom text markers. For example, square brackets "[ ]" or tildas "-" may be used to indicate a token. Indicia of a token trigger the ML viewer 217 to resolve a value of the token.

The ML viewer 217 retrieves current or appropriate values for the tokens in the ML document. For example, token values may change with time or game condition. Alternatively, for example, token values may change based on a game being played or a user, such as a particular gaming establishment, configuring the gaming machine. The ML viewer 217 may access data storage directly or may utilize one or more other processes, such as a dynamic link library (DLL), to access data storage. Thus, the display 53 of a gaming machine 17 may be dynamically configured based on user, game, and/or other condition.

Information retrieved from a local data storage or information entered by a user may replace one or more tokens in a temporary copy of the persistent ML document located at the gaming machine 17 (i.e., "resolving the token"). In an embodiment, however, the ML document is not modified. The ML document may be stored in non-volatile storage, for example. Information in a local or remote data storage may be dynamically altered by other processes running on SCI 101 or other system component. For example, player identification information, player name, and player points may be stored in the local data storage.

Alternatively, default token values may be provided in the ML document. Additionally, a plurality of token values may be located in the ML document and selected by the user or ML viewer.

For example, an ML document includes a player name token indicating the name of the current player. The ML viewer accesses a local data storage via SCI 101 and determines that the current player is "John Doe." The ML document also includes a point token indicating a number of points for the current player. The ML viewer accesses the local data storage and retrieves the point total for the player (e.g., "John Doe has 1234 points."). Viewer 217 displays page 213 including the ML document with appropriate tokens completed with values from data storage.

Thus, an ML document is a text document including markers for specifying portions of text that have different meanings for different consumers or different situations. The extensible nature of a markup language allows one user to add markers that are ignored by another consumer. Text contained within markers specify the content of the gaming machine's display. Different text and/or graphics may be configured and displayed for different consumers. Screen elements may be structured based on information denoted within certain markers.

Figure 9:
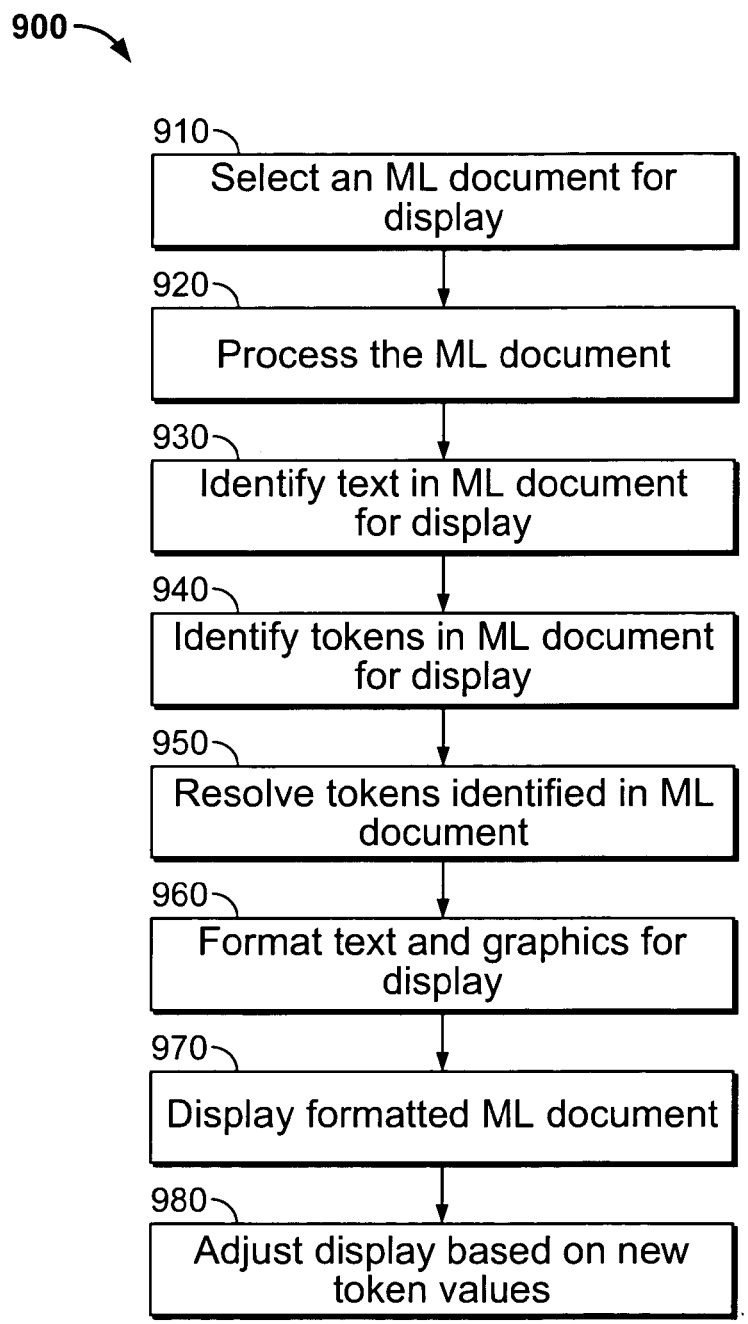
FIG. 9 illustrates a flow diagram for a method for configuring a display in a gaming machine used in accordance with an embodiment of the present invention.

FIG. 9 illustrates a flow diagram for a method 900 for configuring a display in a gaming machine used in accordance with an embodiment of the present invention. First, at step 910, an operator selects a ML file for display at a gaming machine or other gaming system. The operator may select a game for playing on the gaming machine and a corresponding ML file to generate a display for the selected game (a default file, for example). Additionally, one of a variety of displays may be selected for a given game to customize the display and the game for a particular player, location, bonus, etc.

Then, at step 920, an ML viewer processes the ML file to determine the content of the ML document. For example, the ML file includes text and/or links to images and/or additional ML or text files. The ML file also includes tags or other markup language code which serves as instructions for the viewer to process, format, and display the ML file.

At step 930, text in the ML file is identified for display. For example, text may be present in the ML file for display at display 53. Additionally, links or addresses indicating text and/or graphics in another ML file may be present in the ML file. Text and/or graphics and/or links to text and/or graphics may be identified by markup language tags.

Next, at step 940, tokens in the ML file are identified. The tokens signify variable values to be filled in or resolved by the ML viewer. Tokens allow a display to vary depending upon gaming machine location, current player, current game, variable prize, etc. Tokens allow the ML file to be adjusted dynamically without altering the ML file itself.

Then, at step 950, the tokens identified in the ML file are resolved. For example, the ML viewer accesses a data storage to locate the tokens found in the ML file. The ML viewer then replaces the tokens found in the ML file with the relevant values for the particular player, location, and/or game, for example, in a copy of the ML file. Tokens may be resolved dynamically by the gaming machine to adjust the contents of the ML file and display of the ML file without changing the ML file. For example, the ML viewer replaces the tokens in RAM with current token values so as to display the ML file with current token values.

Next, at step 960, text and/or graphics from the ML file are formatted for display on the gaming machine display. Based on tags or other instructions found in the ML file, the text and/or graphics, with resolved token information, is formatted for display. At step 970, the formatted text and/or graphics are displayed at the gaming machine. Options shown on the gaming machine display may be used by a player to play a game at the gaming machine. Options or features on the display that are activated by touch, click, button press, handle pull, or selection method may trigger actions at the gaming machine. That is, options or features displayed at the gaming machine may facilitate gaming machine operation and playability. Alternatively, options on the display may allow an operator to configure the gaming machine or edit an ML document or database entry.

Then, at step 980, the display may be changed based on a new game (e.g., three reels versus five reels), a new player, a new location, and/or a new gaming mode (e.g., progressive mode, special bonus, etc.). For example, a bonus or variable prize may be introduced and thus modify the display. Additionally, for example, a three reel slot game may be changed to a five reel slot game. A game running on the gaming machine may be changed from a quarter slot game to a nickel slot game, for example.

Dynamic token resolution provides improved flexibility in gaming system display and operation. Local look-up of ML file and token information increases speed, as well as reliability. A local data store at a gaming machine or interface may function in conjunction with a server or external data storage to provide information redundancy. A gaming machine may operate on a local copy of an ML file that is periodically refreshed and/or synchronized with a remote copy. Rather than incurring a delay and relying on information transmitted from a server, local data storage in a gaming system provides more immediate access to data. A viewer process running on a gaming machine may reference local storage rather than continually reaching outside the machine for data from an external system. A ML file may be resolved with local information rather than rebuilding the file for display each time at an external server. Local storage may be persistent or volatile (e.g., holds a temporary copy of an ML file and/or token data and reloads in the event of a loss of power). One or more ML files may reside in local storage, and the viewer may switch among the stored documents. Additionally, maintaining communications inside the gaming system improves system security and data integration. In an embodiment, token update is a one-way activity that retrieves and displays values but does not change the original value stored in data storage.

A ML file with tokens may be used to customize a gaming display to variety of options (e.g., user, game, etc.). The gaming industry is a highly regulated environment, and regulators often do not allow third party developers to modify data unless the third party is properly licensed. Often, companies may not obtain a license. Markup language allows a third party to separate data on a page from an application. Thus, data may remain untouched and used in a modifiable display. A static ML file with "blanks", such as tokens or other indicia, may receive gaming regulatory approval because the core document remains unchanged despite token resolution. A display may be completely customized without resubmitting the ML file to regulators for re-approval because the underlying data has not changed. Thus, a player may perceive a change in game on a gaming machine due to a change in token resolution while the underlying ML code remains the same. Additionally, a language being displayed may be customized to a particular player through appropriate token resolution.

Extensible Markup Language Files

In an embodiment, a markup language is a language that may be extensible (e.g., HTML, XML, XSLT, WML, BXML, WBXML, ASP, etc.). Modules may be delineated using a markup language, and existing modules may be modified.

Modules may be placed around other modules or in other relationships with respect to other modules. Thus, a hierarchical structure may be constructing using a markup language.

Resource Interchange File Format (RIFF) files, such as Tagged Image File Format (TIFF), Audio Image File Format (AIFF), Motion Picture Experts Group (MPEG), Windows Audio Volume (WAV), Audio Video Interleaved (AVI), Musical Instrument Digital Interface (MIDI), or other file, are binary markup language files. Elements in an exemplary binary ML file includes a tag field indicating what the data is, a length field indicating how long the data is, and a data field including data. Binary ML files may also include pointers before the data field instructing a processing program to go to a certain location for the data. Additional tag(s), length(s), and data may be nested within a data field.

While the tag and length fields are binary, the data field may or may not be binary. Thus, text-based and/or binary data may be inserted in a binary ML file. Tokens may be inserted in the data, and may be resolved from the data field. Information may be added to music (e.g., WAV, MPEG, etc.), movies (e.g., MPEG, QuickTime, etc.), and/or images (e.g., TIFF, etc.). For example, text streams, buttons, position information, identification information, etc., may all be encoded in a binary ML file. A ML viewer reads the inserted information, but an audio/video system simply skips over the unknown data. Such insertion and access allows newer systems to take advantage of additional features and data, while older systems simply ignore the extra content. Thus, a flexible, adaptive, and backwards-compatible system is provided.

External Control of ML Processing

In addition, the markup language viewer may be externally influenced for navigation, refreshing and linking purposes in a gaming or ancillary gaming application. By using communications, such as inter-process, intra-process, inter-device, flags, semaphores, and/or other indicators, a ML viewer may be influenced to navigate to a location within the current ML document or to any of a number of other ML documents. Messages to the ML viewer originate from one or more external management processes, program inputs and/or user inputs.

In an embodiment, an external process, such as a hosting process, being aware of many conditions within a device, influences the displaying of the contents of a markup language document. The ML viewer may navigate to and display the ML document immediately regardless of current or prior activity. A ML document viewer may perform a look-up process to resolve a destination "screen code" to a literal ML document file name. In another embodiment, a control program may send a message instructing a viewer, browser, or other program to access a certain web page.

The control program may react under particular conditions, such as a jackpot, a tilt, or other event at a gaming machine or other location. The control program may also react to a stimulus, such as insertion of a player or employee card, at a gaming system to generate a command for the viewer to execute a certain action or series of actions immediate. For example, if a player card is inserted, an external server loads player and/or tracking data and transmits an ML file to the viewer for immediate execution. The viewer receives the information from the external server, retrieves the ML file from storage, and processes the ML file.

In an embodiment, an initial ML document may be loaded at a gaming system. The initial document includes directions regarding where to advance next to display new pages on a display (e.g., FIG. 4). Process flow may proceed as dictated by the initial ML document or program sequence until an external process intervenes. An asynchronous interrupt by an external process redirects gaming system operation.

In another embodiment, a "hot spot" button or other indicator may be added to a gaming system display. Selecting the button triggers certain special functions. The button or indicator may be visible or may be hidden (for example, an Aristocrat logo may be a hot spot button).

Additionally, as shown in FIG. 4, an ML file may associate identification (ID) numbers with items for display. When an item is selected by a user (e.g., using a touchscreen, keyboard, or mousing device), the ID number is relayed by a viewer program to a control program. The control program returns an ML file to the viewer program or transmits an instruction to access a certain ML file. The instruction may also be present in the current ML file. For example, FIG. 4 shows that form a form ID of 1, the next form link is 3. Pin numbers or other information typed at a touch pad, for example, may be verified through an association of display items with ID numbers.

In addition, a markup language viewer may be used for reporting interactivity to applications or processes external to the ML viewer in a gaming or ancillary gaming application. Through the use of inter-process communications, a markup language viewer reports activity to one or more external processes. Typically, activity consists of any clicks, touches, or page changes. An external hosting process may use activity information to alter its behavior. Attributes in a markup language document provide codes which may be sent to one or more external or hosting processes when user activity at the viewer activates associated visual elements.

Thus, certain embodiments of the present invention provide a system and method for using markup language in gaming applications. Certain embodiments allow an ML file to be run, viewed, and/or parsed to configure or modify one or more gaming machines. Certain embodiments allow interaction with a user through ML (e.g., between a game, a central system, a user, and/or a database, etc.). Certain embodiments identify communications or interaction between an ML viewer and a gaming application. Certain embodiments utilize tokens to customize a page dynamically without altering code for a web page. Improved communication within a gaming system and reduced communication with external systems improves security, performance, and reliability/redundancy of gaming systems and applications.

While the invention has been described with reference to certain embodiments, it will be understood by those skilled in the art that various changes may be made and equivalents may be substituted without departing from the scope of the invention. In addition, many modifications may be made to adapt a particular situation or material to the teachings of the invention without departing from its scope. Therefore, it is intended that the invention not be limited to the particular embodiment disclosed, but that the invention will include all embodiments falling within the scope of the appended claims.

The invention claimed is:

1. A configurable gaming system, said system comprising:
   at least one data store for storing a markup language file selected from the group consisting of
   1) a mark-up language file and
   2) a mark-up language file including token resolution information for use in a gaming application;
   a processor and game program instructions (that have been approved by a regulatory authority); and
   a markup language viewer for processing said markup language file, said markup language viewer resolves tokens in said markup language file including token resolution information using said token resolution information from said local storage without modifying the game program instructions to generate a resolved markup language file for display at a gaming system, said markup language file generates a display for the gaming application and customizes the display and the gaming application, and said markup language viewer for said mark-up language files including token resolution information dynamically adjusts the display and execution of the gaming application based on token values updated based on a change in at least one of a user, a game, and a game condition.

2. The system of claim 1, wherein said markup language files include files which display content, markup language tags, and tokens.

3. The system of claim 1, wherein said markup language file is updated from an external storage.

4. The system of claim 1, further comprising an external event controlling selection of a markup language file for processing by said markup language viewer.

5. The system of claim 1, wherein said markup language file comprises a binary markup language file including tokens or other indicia for resolution.

6. The system of claim 1, wherein said markup language file associates items for display with identifiers, wherein said identifiers correspond to instructions for said markup language viewer.

7. A method for dynamic configuration of a gaming display, said method comprising:
processing a markup language file for use in a gaming application to identify tokens to be resolved to customize the gaming application, said markup language file including 1) read only, regulatory approved game data to facilitate play of the gaming application and 2) one or more tokens relating to at least one of game theme, game display and player identity;
resolving said tokens to generate a resolved markup language file without modifying the read only, regulatory approved game data;
formatting said resolved markup language file for display;
displaying said resolved markup language file at a gaming system, wherein said resolved markup language file generates a display for the gaming application and customizes the display and the gaming application; and
dynamically adjusting the display and execution of the gaming application based on token values updated based on a change in at least one of a user, a game, and a game condition.

8. The method of claim 7, further comprising retrieving said markup language file from a local storage.

9. The method of claim 8, wherein said resolving step further comprises resolving tokens in said markup language file using data from said local storage.

10. The method of claim 7, wherein said resolving step further comprises resolving tokens in said markup language file based on at least one of a player, an operator, a game, and a location.

11. The method of claim 7, wherein said displaying step further comprises displaying said resolved markup language file at said gaming system using a viewer.

12. The method of claim 7, wherein said step of dynamically adjusting further comprises adjusting token values in said resolved markup language file based on a change in at least one of game, prize, location, player, and operator.

13. The method of claim 7, wherein an external process affects selection of said markup language file for processing and display.

14. A dynamically configurable gaming system, said system comprising:
a gaming machine retrieving a markup language document for use in a gaming application at the gaming machine, said markup language document including static, regulatory approved game execution information and tokens representing dynamic game customization information, wherein said gaming machine automatically resolves tokens in said markup language document and formats said markup language document for display to customize display and execution of a gaming application, wherein the static, regulatory approved game execution information facilitates play of the gaming application and is not modified by the resolution of the tokens; and
a local storage device providing a copy of said markup language document to said gaming machine, said local storage device providing said gaming machine with information to resolve tokens in said markup language document for display, said information updateable based on input information provided to said gaming machine,
wherein said gaming machine dynamically updates resolution of said tokens in said markup language document and reformats said markup language document for display and execution of the gaming application based on a change in at least one of a time, a game condition, a game type, and a user.

15. The system of claim 14, further comprising a server providing information relating to said markup language to said gaming machine.

16. The system of claim 14, wherein said gaming machine further comprises a markup language viewer for resolving said tokens in said markup language document and formatting said markup language document for display.

17. The system of claim 14, wherein said markup language document is adjusted based on a change in at least one of game, prize, location, player, and operator.

18. The system of claim 14, wherein said markup language document comprises a binary markup language document.

19. The system of claim 14, further comprising an external control controlling selection of a markup language file for processing by said gaming machine.

20. The system of claim 14, wherein said markup language document comprises display content and indicia.

21. A system for connecting to a plurality of electronic gaming devices for acquiring, storing and displaying data in a regulated environment, said system comprising:
an electronic display associated with each gaming device;
each said gaming device including a processor to control said display, each processor including a first program of instructions in a markup language stored in a data structure, the content of said first program including a regulatory approved read only code module configured to (1) control said display to display a predetermined display template defining at least one volatile data field and (2) issue data commands for data tokens, said first program configured to generate a display for a gaming application; and
a host computer in communication with said processors to receive operation data from said devices, said host configured to (1) based upon said data received from said devices derive said data tokens and (2) in response to receipt of a command from at least one of said processors communicate said derived token to said processor to control the display to display the token data in said data field in conjunction with the gaming application, wherein the gaming application is customized based on the token data, wherein said processor displays and executes the gaming application for the gaming machine using said derived token information to define said at least one volatile data field in said display template, said display template dynamically forming a gaming application customized for execution and play by a player on the gaming machine.

22. The system of claim 21, wherein said markup language comprises a binary markup language.

23. The system of claim 21, wherein said host computer derives said data tokens using information from a data storage device.

24. The system of claim 21, wherein said markup language associates said instructions with areas of said display template.

25. The system of claim 24, wherein said display further comprises a user interface allowing a user to select at least one of said areas of said display template to execute an instruction.

* * * * *